`US007950055B2`

(12) United States Patent
Blinn et al.

(10) Patent No.: US 7,950,055 B2
(45) Date of Patent: May 24, 2011

(54) CROSS-DOMAIN AUTHENTICATION

(75) Inventors: Arnold N. Blinn, Clyde Hill, WA (US);
Wei-Quiang Michael Guo, Bellevue, WA (US); Wei Jiang, Kirkland, WA (US); Raja Pazhanivel Perumal, Kirkland, WA (US); Iulian D. Calinov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/581,355

(22) Filed: Oct. 19, 2009

(65) Prior Publication Data

US 2010/0042735 A1 Feb. 18, 2010

Related U.S. Application Data

(63) Continuation of application No. 10/798,580, filed on Mar. 10, 2004, now Pat. No. 7,636,941.

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl. ............................................. 726/21; 726/17
(58) Field of Classification Search ........................ None
See application file for complete search history.

(56) References Cited

U.S. PATENT DOCUMENTS

| | | | |
|---|---|---|---|
| 5,390,170 A * | 2/1995 | Sawant et al. ................. | 370/399 |
| 5,535,279 A | 7/1996 | Seestrom | |
| 5,812,776 A | 9/1998 | Gifford | |
| 5,864,843 A | 1/1999 | Carino, Jr. et al. | |
| 5,873,086 A * | 2/1999 | Fujii et al. .............................. | 1/1 |
| 5,875,296 A | 2/1999 | Shi et al. | |
| 5,889,942 A | 3/1999 | Orenshteyn | |

(Continued)

FOREIGN PATENT DOCUMENTS

EP    0969366 A1    1/2000

(Continued)

OTHER PUBLICATIONS

Eirinaki, Magdalini et al., "Web Mining for Web Personalization," ACM Transactions on Internet Technology, Feb. 2003, pp. 1-27, vol. 3, No. 1, ACM Press, New York.

(Continued)

*Primary Examiner* — Kambiz Zand
*Assistant Examiner* — Dant B Shaifer Harriman
(74) *Attorney, Agent, or Firm* — Senniger Powers LLP

(57) ABSTRACT

Providing services within a network of service providers sharing an authentication service and a set of business rules. A central server receives a first request from a first server to provide a first service to a user via a client without forcing the user to present credentials. In response to the received first request, the central server stores data identifying the first service on the client. The central server further receives a second request from a second server to provide a second service to the user via the client after the user presents the credentials to the second service. After receiving the second request and the presented credentials, the central server allows the user access to the second service. In response to allowing the user access to the second service, the central server further allows the user access to the first service as a result of the stored data.

20 Claims, 6 Drawing Sheets

U.S. PATENT DOCUMENTS

| | | | |
|---|---|---|---|
| 5,903,721 | A | 5/1999 | Sixtus |
| 5,918,228 | A | 6/1999 | Rich et al. |
| 5,944,824 | A | 8/1999 | He |
| 5,959,985 | A | 9/1999 | Freen et al. |
| 5,987,232 | A | 11/1999 | Tabuki |
| 6,005,939 | A | 12/1999 | Fortenberry et al. |
| 6,006,332 | A | 12/1999 | Rabne et al. |
| 6,052,730 | A | 4/2000 | Felciano et al. |
| 6,055,236 | A | 4/2000 | Nessett et al. |
| 6,064,666 | A | 5/2000 | Willner et al. |
| 6,065,055 | A | 5/2000 | Hughes et al. |
| 6,070,243 | A | 5/2000 | See et al. |
| 6,088,451 | A | 7/2000 | He et al. |
| 6,092,196 | A | 7/2000 | Reiche |
| 6,134,592 | A | 10/2000 | Montulli |
| 6,138,159 | A | 10/2000 | Phaal |
| 6,148,404 | A | 11/2000 | Yatsukawa |
| 6,212,573 | B1 * | 4/2001 | Lim et al. ............ 719/315 |
| 6,226,752 | B1 | 5/2001 | Gupta et al. |
| 6,246,771 | B1 | 6/2001 | Stanton et al. |
| 6,253,325 | B1 | 6/2001 | Steele et al. |
| 6,256,664 | B1 | 7/2001 | Donoho et al. |
| 6,301,617 | B1 | 10/2001 | Carr |
| 6,314,425 | B1 | 11/2001 | Serbinis et al. |
| 6,321,262 | B1 | 11/2001 | Springer |
| 6,363,365 | B1 | 3/2002 | Kou |
| 6,374,359 | B1 | 4/2002 | Shrader et al. |
| 6,421,781 | B1 | 7/2002 | Fox et al. |
| 6,438,600 | B1 | 8/2002 | Greenfield et al. |
| 6,442,608 | B1 * | 8/2002 | Knight et al. ............ 709/225 |
| 6,463,474 | B1 | 10/2002 | Fuh et al. |
| 6,466,969 | B1 | 10/2002 | Bunney et al. |
| 6,484,257 | B1 | 11/2002 | Ellis |
| 6,484,263 | B1 | 11/2002 | Liu |
| 6,487,495 | B1 | 11/2002 | Gale et al. |
| 6,487,584 | B1 | 11/2002 | Bunney |
| 6,578,199 | B1 | 6/2003 | Tsou et al. |
| 6,584,505 | B1 | 6/2003 | Howard et al. |
| 6,598,167 | B2 | 7/2003 | Devine et al. |
| 6,640,239 | B1 | 10/2003 | Gidwani |
| 6,677,976 | B2 * | 1/2004 | Parker et al. ............ 348/14.08 |
| 6,678,731 | B1 | 1/2004 | Howard et al. |
| 6,678,828 | B1 | 1/2004 | Pham et al. |
| 6,687,743 | B1 | 2/2004 | Innes |
| 6,725,376 | B1 | 4/2004 | Sasmazel et al. |
| 6,772,139 | B1 | 8/2004 | Smith, III |
| 6,826,456 | B1 * | 11/2004 | Irving et al. ............ 700/299 |
| 6,851,060 | B1 | 2/2005 | Shrader |
| 6,859,879 | B2 | 2/2005 | Henn et al. |
| 6,871,279 | B2 | 3/2005 | Sames et al. |
| 6,888,828 | B1 | 5/2005 | Partanen et al. |
| 6,912,582 | B2 | 6/2005 | Guo et al. |
| 6,941,475 | B1 | 9/2005 | Assetto et al. |
| 6,954,799 | B2 | 10/2005 | Lerner |
| 6,981,156 | B1 | 12/2005 | Stern et al. |
| 6,985,955 | B2 | 1/2006 | Gullotta et al. |
| 7,036,142 | B1 | 4/2006 | Zhang et al. |
| 7,051,094 | B1 | 5/2006 | Sahai et al. |
| 7,073,195 | B2 | 7/2006 | Brickell et al. |
| 7,401,235 | B2 | 7/2008 | Mowers et al. |
| 7,636,941 | B2 * | 12/2009 | Blinn et al. ............ 726/21 |
| 7,639,672 | B2 | 12/2009 | Foote |
| 7,739,364 | B2 * | 6/2010 | Willehadson et al. ........ 709/223 |
| 7,817,619 | B1 * | 10/2010 | Curry et al. ............ 370/352 |
| 2001/0025256 | A1 | 9/2001 | Oliphant et al. |
| 2001/0034841 | A1 | 10/2001 | Shambroom |
| 2001/0037462 | A1 | 11/2001 | Bengtson |
| 2001/0054155 | A1 | 12/2001 | Hagan et al. |
| 2002/0029350 | A1 | 3/2002 | Cooper et al. |
| 2002/0091639 | A1 | 7/2002 | Mandahl et al. |
| 2002/0095389 | A1 | 7/2002 | Gaines |
| 2002/0099809 | A1 | 7/2002 | Lee |
| 2002/0112155 | A1 | 8/2002 | Martherus et al. |
| 2002/0112183 | A1 | 8/2002 | Baird, III et al. |
| 2002/0133723 | A1 | 9/2002 | Tait |
| 2002/0150253 | A1 | 10/2002 | Brezak et al. |
| 2002/0152380 | A1 | 10/2002 | O'Shea et al. |
| 2002/0152393 | A1 | 10/2002 | Thoma et al. |
| 2002/0194501 | A1 | 12/2002 | Wenocur et al. |
| 2003/0037131 | A1 | 2/2003 | Verma |
| 2003/0046550 | A1 | 3/2003 | Carroll et al. |
| 2003/0084172 | A1 | 5/2003 | deJong et al. |
| 2003/0093694 | A1 | 5/2003 | Medvinsky et al. |
| 2003/0149880 | A1 | 8/2003 | Shamsaasef et al. |
| 2003/0163691 | A1 | 8/2003 | Johnson |
| 2003/0163693 | A1 | 8/2003 | Medvinsky |
| 2003/0188193 | A1 | 10/2003 | Venkataramappa |
| 2003/0204579 | A1 | 10/2003 | Lutz |
| 2004/0002878 | A1 | 1/2004 | Maria Hinton |
| 2004/0003084 | A1 | 1/2004 | Malik et al. |
| 2004/0019808 | A1 | 1/2004 | Devine et al. |
| 2004/0068665 | A1 | 4/2004 | Fox et al. |
| 2004/0098616 | A1 | 5/2004 | Jenner et al. |
| 2004/0139439 | A1 | 7/2004 | Machida et al. |
| 2004/0158743 | A1 | 8/2004 | Ham et al. |
| 2004/0225878 | A1 | 11/2004 | Costa-Requena et al. |
| 2005/0005133 | A1 | 1/2005 | Xia et al. |
| 2005/0074126 | A1 | 4/2005 | Stanko |
| 2005/0114712 | A1 | 5/2005 | Devine et al. |
| 2005/0149759 | A1 | 7/2005 | Vishwanath et al. |
| 2005/0216771 | A1 | 9/2005 | Malcolm |
| 2005/0235341 | A1 | 10/2005 | Stieglitz et al. |
| 2006/0190505 | A1 | 8/2006 | DeMaio et al. |
| 2008/0080711 | A1 | 4/2008 | Gagnon et al. |
| 2008/0256364 | A1 | 10/2008 | Chang et al. |

FOREIGN PATENT DOCUMENTS

| | | |
|---|---|---|
| WO | 01/77775 A2 | 10/2001 |
| WO | 02/33884 A2 | 4/2002 |

OTHER PUBLICATIONS

Pfitzmann, Birgit et al., "Privacy in Browser-Based Attribute Exchange," Proceedings of the ACM Workshop on Privacy in the Electronic Society, 2002, pp. 52-61, ACM Press, New York.

Samar, Vipin, "Single Sign-On Using Cookies for Web Applications," Enabling Technologies: Infrastructure for Collaborative Enterprises Proceedings, IEEE 8th International Workshops, Jun. 16, 1999, pp. 158-163.

Steiner, Jennifer G. et al., "Kerberos: an Authentication Service for Open Network Systems," USENIX Winter Conference, 1988, pp. 1-15.

Lin, et al., eBroker: An Agent-Based Query Routing System for Distributed E. Commerce Databases, Proceedings of Seventh International Conference on Parallel and Distributed Systems, 2000, pp. 517-522, http://ieeexplore.ieee.org/stamp/stamp.jsp?tp=&arnumber=857737.

* cited by examiner

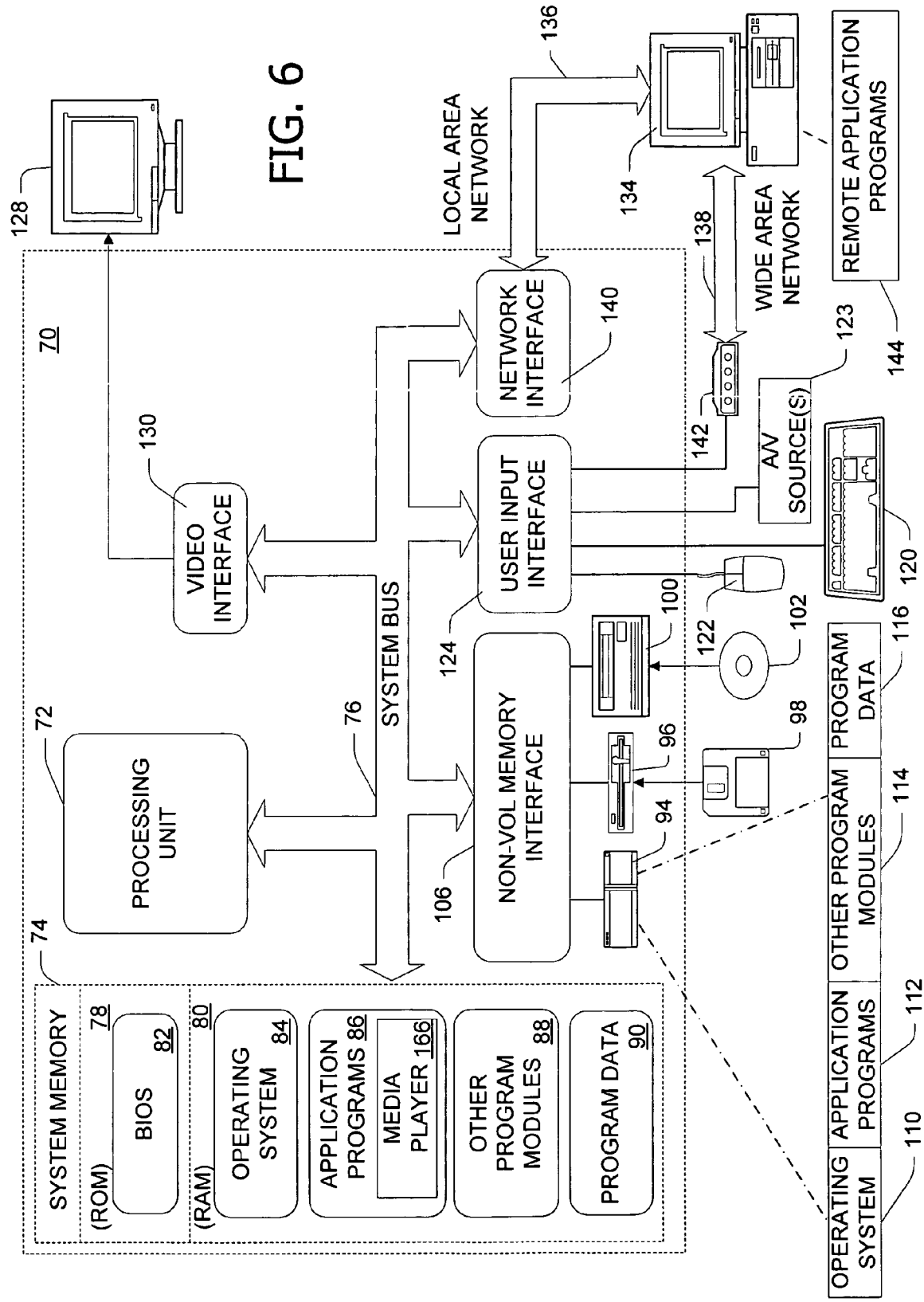

CROSS-DOMAIN AUTHENTICATION

TECHNICAL FIELD

Embodiments of the present invention relate to the field of computer network environments. In particular, embodiments of this invention relate to controlling access of a user to sites or services across different domains.

BACKGROUND OF THE INVENTION

Web sites, or Internet sites, often provide information, products, services, and the like to their users. Many web sites require a user to "register" before their web servers will grant access to the user. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site may request that the user select a login identifier, or login ID, and an associated password. The login ID allows the web site to identify the user and retrieve information about the user during subsequent user visits to the web site. Generally, the login ID is unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

Using a presently available multi-site user authentication system, a web user can maintain a single login ID (and associated password) for accessing multiple, affiliated web servers or services. Such a system permits the user to establish a unique account identified by, for example, an e-mail address.

Large Internet service providers often have many different web sites through which they offer services to consumers. Moreover, a single web service can actually be made up of many different content providers. Other sites may be used to provide content related to children's interests, e-shopping, news, and so forth. Consumers usually perceive these related sites as being essentially the same service. Further, as Internet usage migrates to a subscription-based model that includes content and services from a variety of different sites, the need exists for automatically authenticating a user for related sites and accurately sharing common information (e.g., billing and subscription information) between related sites.

As described above, a web site often gathers personal information about its users for later use. A typical privacy statement for a web site describes how the site protects and uses personal information. The policy will likely specify first what information the site collects. For example, the site may maintain a profile for the user including information such as the user's e-mail address, first and last name, country or region, state or territory, ZIP code or postal code, language preference, time zone, gender, birth date, occupation, telephone number(s), credit card information, billing and shipping addresses, password, PIN, secret question and secret answer, clothing sizes, music preferences, and the like. Inasmuch as this profile information can be quite sensitive, the typical policy also specifies how the information will or will not be used. For example, a web site's privacy policy may forbid the site from selling or renting a user's personal information without prior consent. The same policy, however, may detail a number of permitted uses (e.g., resolving customer support inquiries, performing statistical analyses of the site's services, conforming to legal requirements, protecting the personal safety of users or the public). A typical policy often specifies certain circumstances under which disclosures or uses of information are permitted and those other circumstances under which they are not.

Presently, there exist systems and methods for automatically authenticating a user for access to a site or service if the user has previously signed in to another site or service. Such prior systems and methods automatically sign in the user to the latter site or service by performing a "silent" authentication, i.e., signing in the user to the latter site or service without re-asking for user credentials (e.g., login ID and password).

As one particular example of the prior systems and methods, a user may navigate to a first selected service, namely, Service A, by using a browser of a client computer. If the user is not already signed in to Service A, Service A may provide a link on the web page for the user to sign in to Service A. When the user clicks on this link, he or she is redirected to a web page hosted by an authentication server, at which point the authentication server prompts the user for his or her user credentials. Since the user is forced to submit his or her user credentials, such prompting for credentials is referred to as a "hard authentication." If the submitted user credentials have been successfully authenticated, the authentication server may issue a cookie in the domain of the authentication server, which includes an encrypted authentication ticket that authenticates the user. This encrypted authentication ticket may contain a simple "access" token, which verifies that the user is who he or she claims to be. It also may contain some of the "profile" data. The authentication server then stores this cookie, which is in the domain of the authentication server, on the client computer and redirects the browser to a return uniform resource locator (URL) in the domain of Service A. This return URL includes several parameters on its query string, including a parameter that specifies the authentication ticket encrypted specifically to Service A as well as operational parameters specific to Service A. After the browser is redirected to the return URL of Service A, Service A may use the query string parameters to issue a cookie written in its own domain and store this cookie on the client computer. Again, this cookie may contain both the simple access token and some encrypted form of the profile data.

And in this example, the user may later use the browser to navigate to Service B. If Service A and Service B are in the same domain and if the user is still signed in to Service A, then Service B can silently redirect the user to the authentication server to sign in the user to itself. But if the user is no longer signed in to Service A, then the user would be forced by Service B to provide his or her user credentials (i.e., by performing a hard authentication), which may not be an acceptable user experience from the perspective of Service B.

As can be seen in this example, even though the prior systems and methods allow the user to be "silently" signed in to Service B (i.e., signing in without resubmitting the user credentials), such "silent" authentication is limited to situations where Service A and Service B are within the same domain and situations where performing a hard authentication to sign in the user is acceptable to Service B when the user is not already signed in to Service A). This is because cookies are domain-specific, and accordingly, sites or services in one domain may not access cookies issued by sites or services in a different domain. For various reasons, many of the sites or services owned by a service provider may be in different domains, even though it is clear to the users that they are affiliated. Some examples of such situations include sites or services in international domains. Also, many sites or services today may not desire to force a hard authentication on a user if it is unnecessary but would prefer to obtain the user's credentials if they are already available from another authentication transaction.

Currently, there are several approaches to authenticate a user when Service A and Service B are in different domains and when Service B does not wish to perform a hard authentication on the user. In one approach, the return URL of the destination site, namely, Service B, may include a special parameter that indicates the sign-in status of the user at the calling site, namely, Service A. Service B can then perform a "silent" authentication for the user. This may involve some logic on Service A to pass this special parameter to Service B and some logic on Service B to respond to this special parameter. In addition, since most cross-site links direct users through a central redirect server, this central redirect server may detect the sign-in status of the user at Service A and handle the necessary sign-in to Service B. Problems of this approach, however, are that it is difficult to implement links with special parameters and that it requires special coordination between Service A and Service B. And this approach does not address cases where the user navigates to Service B directly or through a link in a hotlist, bookmark list, or Favorites folder (i.e., without clicking a link on a web page of Service A that directs to Service B).

In another approach, after the user is signed in to Service A, the post sign-in web page of Service A may include some logic to determine an alternate domain, in this case Service B, and get the user signed in to the alternate domain. But this approach requires sites or services to implement extra logic on their post sign-in web pages. It also requires services to be aware of the alternate domains to perform this post-processing and accordingly is error-prone. And there lacks a consistent technique for determining whether a particular site or service is the alternate domain of another site or service.

In yet another approach, if the user is signed in to Service A, Service A can get the user signed in to Service B by first redirecting the user to a web page of Service B, signing in the user for Service B via the authentication server, and then redirecting the user back to Service A. A cookie is then issued in the domain of Service A to indicate that the sign-in for Service B was performed. In an alternative approach, after the user navigates to Service B and after Service B determines that the user is not signed in to Service B, Service B may check if the user is signed in to an alternate domain, i.e., Service A. Specifically, Service B may check with Service A to see if the user is signed in to Service A. Service A would then check if the user is signed in to itself, and if so, get the user signed in to Service B via the authentication server. The problem of this approach is that if the user is not signed in to Service A, it is difficult to avoid having the sign-in status checked for most web pages of Service A. This may cause significantly increased rendering time for the user. And the services would need to implement extra logic in order to sign in the user to an alternate domain. This may be prohibitive for large service providers and may be error-prone. Such an approach also does not perform well when there are multiple domains in the same group because checking with each one of the multiple domains is not practical.

As can be seen in the described approaches, the user is required to access the authentication server again when attempting to sign in to an alternate domain even though he or she has already been authenticated by the authentication server. This generates an extra set of server redirects and, as a result, decreases the response time of the authentication server and increases the latency for the user to sign in. Prior systems and methods further fail to allow sites to implement cross-domain authentication that does not request available user credentials without cumbersome coding and coordination between the sites. The failure of the prior systems and methods to provide effective cross-domain authentication thus impairs users' expectations that a single login ID automatically provides access to multiple, affiliated sites and services even if they are in different domains.

Accordingly, a solution is needed that effectively provides a user access to sites or services across different domains while complying with a set of business rules and without requesting available user credentials.

SUMMARY OF THE INVENTION

Embodiments of the invention overcome one or more deficiencies in the prior art by providing, among other things, cross-domain, soft authentication for a user seeking access to multiple, affiliated sites, services, or applications. When a user of a client computer visits a first site, embodiments of the invention advantageously allow the user to be automatically signed in to the first site if the user has previously signed in to another site that implements a common set of business rules such as privacy statements with the first site. If the user has not previously signed in to another site that implements a common set of privacy statements, then an authentication server advantageously stores a cookie on the client computer to indicate that the user has visited the first site. Thereafter, when the user signs in to another site that implements a common set of business rules such as privacy statements with the first site, one embodiment of the invention effectively determines that the user has visited the first site based on the cookie stored on the client computer. Accordingly, one embodiment of the invention advantageously signs in the user to the first site based on the user credentials submitted to the other site for hard authentication. One or more other embodiments of the invention also effectively avoid the need for the first site to authenticate the user again if it has already requested to authenticate the user. As such, when the user later visits the first site, he or she will appear to have already been authenticated.

In one embodiment of the invention, the first site can determine if the user has been authenticated for another site that shares the same business rules (e.g., privacy statements) with the first site without apparent interruption to the user's navigation experience. Further, one embodiment of the invention advantageously notifies the first site when the user has been "hard" authenticated by another site that shares the same business rules. Embodiments of the invention then allow the first site to re-authenticate the user when the user revisits the first site, thus preventing unnecessary and unwanted user navigation across different sites. In addition, according to one embodiment of the invention, the client computer communicates with an authentication server via an image tag instead of via a redirect to prevent the authentication server from becoming a single point of failure for the services and to eliminate security concerns that result from including a source script to obtain the user's authentication ticket. Moreover, the features of embodiments of the present invention described herein are less laborious and easier to implement than currently available techniques as well as being economically feasible and commercially practical.

Briefly described, a method employing aspects of the invention provides a first service and a second service to a user via a client coupled to a data communication network. The first service is provided by a first network server also coupled to the data communication network. The second service is provided by a second network server also coupled to the data communication network. The method includes receiving a first request from the first network server to provide the first service to the user. The method also includes storing first data on the client in response to the received first request. The first data identifies the first service. The method further includes receiving a second request from the second network server to provide the second service to the user. The method includes allowing the user access to the second service in response to the received second request. In response to allowing the user access to the second service, the method includes allowing the user access to the first service as a result of the stored first data.

In another embodiment of the invention, a method employing aspects of the invention provides a first service and a second service to a user via a client coupled to a data communication network. The first service is provided by a first network server also coupled to the data communication network. The second service is provided by a second network server also coupled to the data communication network. The method includes receiving a first request from the first network server to provide the first service to the user. The method also includes allowing the user access to the first service in response to the received first request. The method includes storing first data on the client in response to allowing the user access to the first service. The first data identifies a first policy group associated with the first service. The method also includes receiving a second request from the second network server to provide the second service to the user. If the second service is associated with the first policy group identified by the stored first data, the method includes allowing the user access to the second service in response to the received second request. If the second service is not associated with the first policy group identified by the stored first data, the method includes updating the stored first data to identify the second service.

In yet another embodiment of the invention, a system employing aspects of the invention is adapted to provide services to the user. The system includes a first network server coupled to a data communication network. The first network server is configured to provide a first service to a user via a client also coupled to the data communication network. The system also includes a second network server coupled to the data communication network. The second network server is configured to provide a second service to the user via the client. The system further includes a central server coupled to the data communication network. The central server is configured to receive a first request from the first network server to provide the first service to the user and a second request from the second network server to provide the second service to the user. The first network server is configured to direct the first request to the central server. The central server is further configured to generate and store first data that identifies the first service on the client in response to receiving the first request. The second network server is configured to direct the second request to the central server. In response to the received second request, the central server is configured to allow the user access to the second service. And in response to allowing the user access to the second service, the central server is configured to allow the user access to the first service as a result of the stored first data.

In further yet another embodiment of the invention, a system employing aspects of the invention is adapted to provide services to a user. The system includes a first network server coupled to a data communication network. The first network server is configured to provide a first service to a user via a client also coupled to the data communication network. The system also includes a second network server coupled to the data communication network. The second network server is configured to provide a second service to the user via the client. The system further includes a central server coupled to the data communication network. The central server is configured to receive a first request from the first network server to provide the first service to the user and a second request from the second network server to provide the second service to the user. The system further includes a database associated with the central server. The database is configured to store information identifying a first policy group associated with the first service and a second policy group associated with the second service. In response to the received first request, the central server is configured to allow the user access to the first service and to generate and store first data on the client based on the stored information. The first data identifies the first policy group associated with the first service. If the second policy group identified by the stored information is the same as the first policy group identified by the stored first data, the central server is configured to allow the user access to the second service in response to the received second request. If the second policy group identified by the stored information is not the same as the first policy group identified by the stored first data, the central server is configured to update the stored first data to identify the second service in response to the received second request.

In further yet another embodiment of the invention, computer-readable media employing aspects of the invention have computer-executable components for providing a first service and a second service to a user via a client coupled to a data communication network. The first service is provided by a first network server also coupled to the data communication network. The second service is provided by a second network server also coupled to the data communication network. The computer-readable media include a redirect component for receiving a first request from the first network server to provide the first service to the user and for receiving a second request from the second network server to provide the second service to the user. The computer-readable media also include a response component for storing first data identifying the first service on the client in response to the received first request. The computer-readable media further include an authentication component for allowing the user access to the second service in response to the received second request. And in response to allowing the user access to the second service, the authentication component is adapted to allow the user access to the first service as a result of the stored first data.

Computer-readable media having computer-executable instructions for performing methods of providing services to a user embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

FIG. 6 is a block diagram illustrating an exemplary embodiment of a suitable computing system environment in which one embodiment of the invention may be implemented.

Corresponding reference characters indicate corresponding parts throughout the drawings.

DETAILED DESCRIPTION OF THE INVENTION

Figure 1:
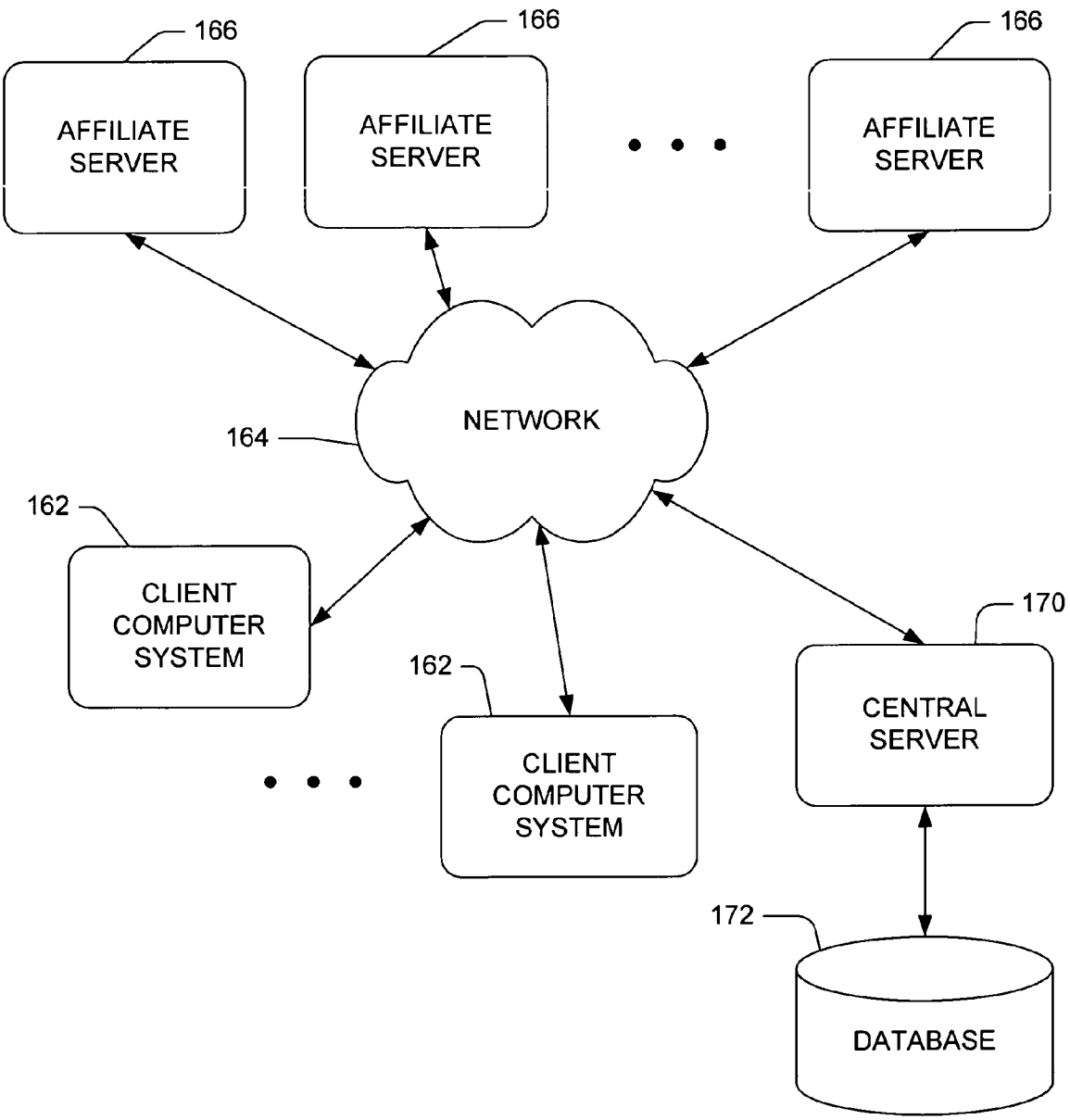
FIG. 1 is a block diagram illustrating an exemplary network environment in which one embodiment of the present invention may be utilized.

Referring now to the drawings, FIG. 1 illustrates an exemplary network environment in which embodiments of the present invention may be utilized for authenticating a user across different domains. Embodiments of the invention relate to cross-internet collaboration between web sites as part of, for example, a distributed, multi-site user authentication system. Such services provide a user with the ability to access one or more participating web sites or resources with a single sign-in. Although the participating sites (referred to herein as "affiliates" or "affiliate sites") maintain control over permissions, they use the authentication service rather than hosting and maintaining their own proprietary authentication systems. According to one embodiment of the invention, the affiliate sites are members of a "service group" or "shared services group" because they represent a group of independent site IDs that together provide a user with a set of services. Shared services groups, however, need not employ the same business rules (or business logic). As used herein, "policy group" or "consent group" refers to a predefined group of sites (or services/applications generally) that have a shared set of business rules to restrict authentication of a user across different domains. For example, this shared set of business rules may identify a common set of permission standards (e.g., a common privacy policy).

In FIG. 1, one or more client computer systems 162 are coupled to a data communication network 164. In this exemplary embodiment of the invention, the network 164 is the Internet (or the World Wide Web). But the teachings of the present invention can be applied to any data communication network. Multiple affiliate servers 166 are also coupled to network 164. The affiliate servers 166 may be referred to as "web servers" or "network servers" generally.

A central server 170 coupled to network 164 allows communication between itself, client computer systems 162, and web servers 166. In operation, one or more client computer systems 162 can access affiliate servers 166 via network 164. Although sometimes referred to as an "authentication server" or "login server" in connection with FIG. 1, the central server 170 in the illustrated embodiment is also a web server capable of interacting with web browsers and other web servers. In this example, server 170, client computer systems 162, and web servers 166 communicate data among themselves using the hypertext transfer protocol (HTTP), a protocol commonly used on the Internet to exchange information.

FIG. 1 further illustrates a database 172 coupled to server 170. In one embodiment, the database 172 includes information (i.e., credentials) necessary to authenticate a registered user of one of the client computer systems 162 (as well as other users on the network). The database 172 also maintains a profile store for registered users and identifies which elements of the user profile information should be provided to a particular affiliate server 166 when the user accesses its service. In general, a credential is a means for generating an authenticated reference to a single account identifier. For example, an e-mail address sign-in name and password, a mobile phone number and PIN, and a biometric signature are credentials that can be associated with the same profile data. Again, the sites/services of affiliated servers 166 may employ a set of business rules, which may be one or more common privacy statements of a hosting service or any other types of rules enforced on the hosting service. Further, the authentication service provided by central server 170 regulates the business rules across different and independent groups of sites/services (e.g., policy groups). In another embodiment of the invention, database 172 also stores records indicating which site IDs match to which policy group ID or service group ID. That is, the records indicate which affiliate sites are members of a particular policy group or service group.

Although database 172 is shown in FIG. 1 as a single storage unit separate from central server 170 for convenience, it is to be understood that in other embodiments of the invention, database 172 may be one or more memories included within or separate from server 170. In a federated environment, for example, a plurality of servers 170 may be used to provide authentication, shared services management, policy and permissions management, and the like.

The server 170, as described herein, may be part of an authentication system that authenticates a user of client computer 162 seeking access to a particular one of the affiliate servers 166. In this embodiment, server 170 first requests authenticating login information from the user, such as the user's login ID and password. If the user is successfully authenticated, the server 170 of FIG. 1 routes the user's client computer 162 to the appropriate affiliate server 166 for performing a desired service for the user.

In one embodiment, an "affiliate server" is a web server that has "registered" or otherwise established a relationship or affiliation with central server 170. A particular affiliate server 166 includes a code sequence (not shown) that allows the affiliate server to communicate with server 170 when a user (who is also registered with server 170) requests access to affiliate server 166. Additional details regarding an exemplary authentication process and the interaction between client computer 162, affiliate servers 166, and server 170 are provided below.

Before executing the authentication process, both the user of client computer system 162 and the operator(s) of affiliate servers 166 "register" with server 170. This registration is a one-time process that provides necessary information to the authentication system. According to one embodiment of the invention, this registration also provides the user with his or her first opportunity to grant consent for the sharing of certain personal information or to learn about particular business rules governing cross-domain authentication.

The user of client computer system 162 registers with server 170 by providing information about the user and/or client computer system 162, such as, the user's name, mailing address, and e-mail address. As part of the user registration process, the user is assigned (or selects) a login ID, which is a common login ID, used to access an affiliate server (e.g., server 166). The login ID may also be referred to herein as a "username," "member name," or "login name." In an alternative embodiment of the invention, the user information is provided to central server 170 and the login ID is assigned to the user as part of the process of signing up with a first affiliate site that uses the authentication service of central server 170.

Additionally, the user selects a password associated with the login ID that is used for authentication purposes. After registering and logging into server 170, the user can visit an affiliate server 166 (i.e., affiliate servers that are also registered with the same authentication server) often without reentering user information that is already included in the associated user profile. An embodiment of the present invention sets forth identifying the user account, or profile, by a unique account identifier.

The central server 170 of FIG. 1, i.e., the authentication server in this embodiment, validates the username/password provided by the user. Server 170 handles the authentication response by comparing the login data to the entries in database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that the authentication server sends (e.g., encrypted) to affiliate servers 166 as the authentication credential when the user signs in. This unique identifier makes it possible for the sites to determine whether the user is the same person from one sign-in session to the next.

Figure 2:
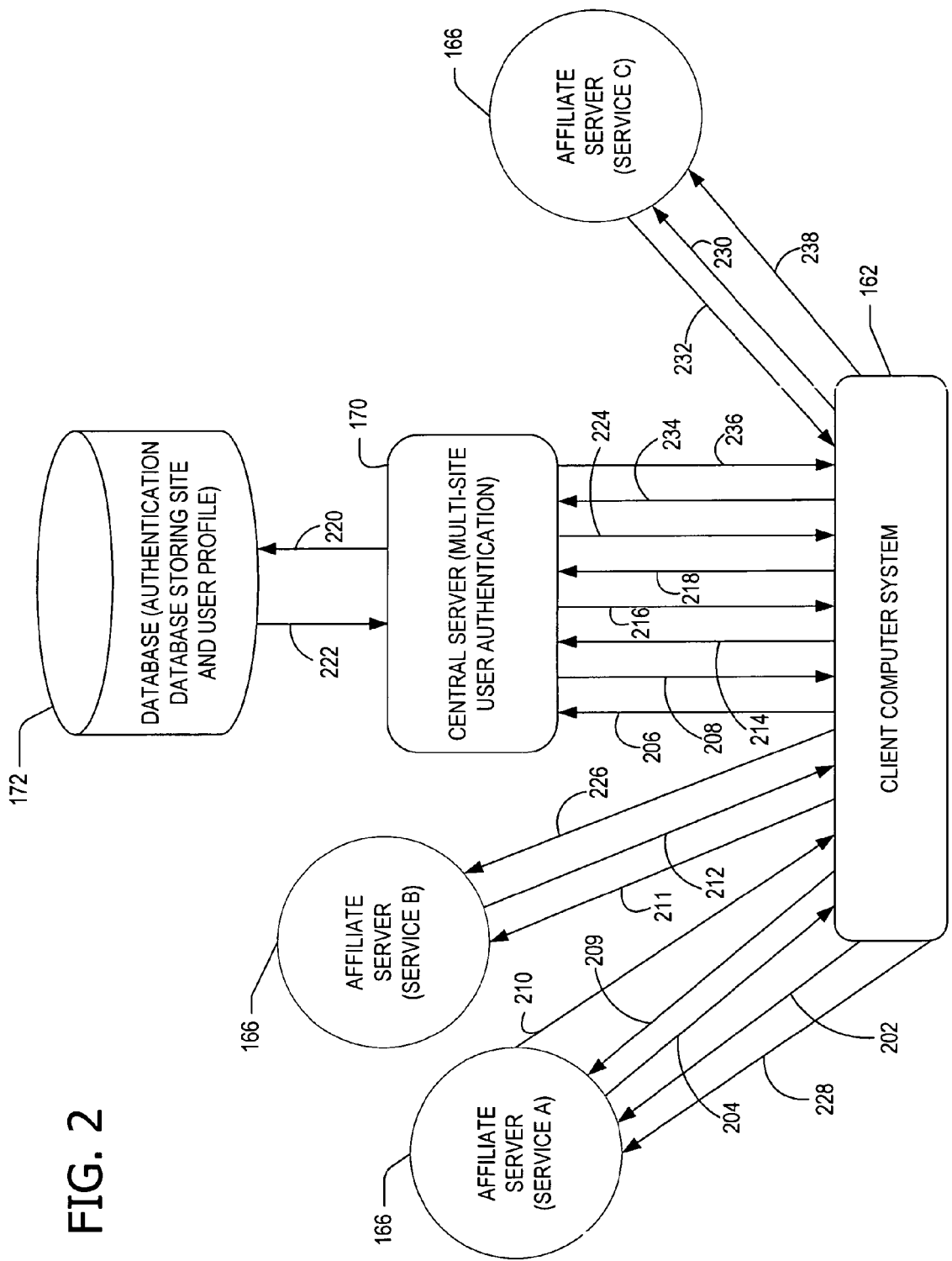
FIG. 2 is a diagram illustrating an exemplary interaction between client computer systems, affiliate servers, and central server of FIG. 1.

FIG. 2 is a diagram illustrating an exemplary implementation of one embodiment of the present invention and the interaction between central server 170, multiple client computer systems 162, and affiliate servers 166. The illustrated example of FIG. 2 describes the situation in which the user of client computer system 162 has not yet logged into an affiliate server 166 and has not yet been authenticated by central server 170. Furthermore, in the illustrated example of FIG. 2, Service A, Service B, and Service C may be in different domains. The consecutively numbered lines with reference characters of 202-238 in FIG. 2 illustrate the flow of information or activities during one exemplary process.

In the exemplary process flow of FIG. 2, the user navigates to a first selected service, namely, Service A, by using a browser of client computer system 162 at 202. Within Service A, there may be web pages that the service administrator would require the user to be authenticated in order to grant the user access to these web pages. For example, such web pages may provide personalized content or premium content that the user has registered for and subscribed with Service A. And these web pages may serve targeted advertisements to the user based on the profile information stored in database 172.

On the other hand, there may be web pages within Service A that the service administrator would prefer but does not require the user to be authenticated in order to grant the user access to these web pages. For such web pages that provide "free-reach" contents, having a unique identifier for tracking the user or for serving targeted advertisements would be useful, but requiring the user to be authenticated may constitute a barrier for accessing Service A. In other words, these web pages "desire" authentication from the perspective of Service A but does not require it. Accordingly, Service A implements "soft authentication" for these web pages. Soft authentication allows these web pages of Service A to obtain the user credentials if the user is already signed in to a site that shares the same set of business rules with Service A but does not request the credentials from the user if the user is not already signed in to the site. That is, by implementing soft authentication, Service A can obtain the user information (e.g., authentication ticket and/or profile information) if it is already submitted to another site that shares the same set of business rules but would not force the user to provide this user information if it is not already available.

Thus, after the user navigates to Service A, Service A determines that the user has not been authenticated by central server 170. But since Service A provides free-reach contents and since the user has not decided to be authenticated (e.g., by clicking a link to sign in), Service A does not redirect the browser of client computer system 162 to a URL that prompts the user for his or her credentials. Instead, Service A includes an image tag in a web page rendered to the browser of client compute system 162. The image tag points the browser to a "Desire Authentication" (or "Soft Authentication") URL of central server 170 at 204 and 206. Alternatively, Service A may redirect the browser to the Desire Authentication URL of central server 170. But using the image tag to communicate with central server 170 instead of via a redirect prevents central server 170 from becoming a single point of failure for the affiliate sites/services and eliminates security concerns that result from including a source script to obtain the user's authentication ticket.

While the Desire Authentication URL does not prompt the user for his or her credentials, it nevertheless indicates to central server 170 that Service A desires to authenticate the user. In other words, by accessing the Desire Authentication URL, Service A directs to central server 170 a request to provide a service to the user. Accordingly, central server 170 at 208 issues a Visited Sites cookie (e.g., named MSPSoftVis) written in the domain of central server 170 and stores the Visited Sites cookie on client computer system 162 to indicate that Service A desires to authenticate the user. Furthermore, central server 170 at 209 would return access denial HTTP status code 400 indicating that Service A has expressed a desire to authenticate the user but presently is not able to because the user has not yet decided to sign in. At 210, the script code from Service A would then issue a Desire Authentication cookie (e.g., named MSPSA) written in its own domain and store this Desire Authentication cookie on client computer system 162. And Service A may provide its free-reach contents to the user.

On a subsequent visit to Service A or within subsequent web pages of Service A, Service A would also determine that the user has not been authenticated by central server 170. The code that includes the image tag pointing to the Desire Authentication URL, however, would see the Desire Authentication cookie previously issued by Service A, which indicates that Service A has already expressed a desire to authenticate the user and, accordingly, would not result in using the image tag. This prevents Service A from conducting multiple requests and avoids central server 170 from receiving multiple authentication requests when the user has not yet decided to be authenticated.

Thereafter, the user uses the browser of client computer system 162 to navigate to Service B at 211. Service B requires the user to be authenticated because it provides personalized or premium content to the user. As a result, Service B redirects the browser to an Authentication URL of central server 170 at 212 and 214. The Authentication URL prompts the user for his or her credentials at 216, and the user submits his or her credentials to central server 170 at 218. At 220, central server 170 then compares the submitted credentials with an entry stored in database 172. If the submitted credentials match an entry stored in database 172, then central server 170 obtains a profile associated with the submitted credentials at 222. Central server 170 further issues a cookie written in its own domain and stores this cookie on the browser of client computer system 162 at 224. Central server 170 at 226 then redirects the browser to a return URL of Service B with an encrypted authentication ticket and profile information attached.

In addition, central server 170 also sees that another site, namely, Service A, has expressed a desire to authenticate the user. Accordingly, central server 170 may authenticate the user for Service A as well. Since the user has already signed in to the same policy group to which Service A belongs, central server 170 may notify Service A that the user has signed in to this policy group. Central server 170 thus constructs an array of image tags, which point to a URL provided by Service A. This URL then clears the Desire Authentication cookies issued by Service A so that when the user returns to Service A thereafter, Service A will try to "soft authenticate" the user.

In an alternative embodiment of the invention, such a notification to Service A is accomplished via an extra set of redirects to Service A. Specifically, if there are one or more sites that "desire" authentication, central server 170 would one by one redirect the browser through scripts on these sites and pass in the user credentials in order for the sites to issue authentication cookies in their own domains.

It is also possible to copy the cookie issued by central server 170 from the domain of Service B to the domain of Service A. Specifically, when central server 170 redirects the browser to the return URL of Service B, the query string would indicate a list of site IDs that desire authentication, including the site ID of Service A. Service B would then render a web page to the browser of client computer system 162, which includes an image tag (e.g., a gif) for the site ID of Service A. This image tag may direct to a script of Service A that obtains the cookie values on the query string issued by central server 170 (including the authentication ticket and profile information) and that writes these values into a cookie in the domain of Service A. In addition, Service B may store a value on client computer system 162 indicating that the issued cookie was copied to Service A, and thus a delete script of Service B may redirect the client computer system 162 to a delete script of Service A when the user decides to sign out of both services.

The issued cookie may be copied as part of the initial sign-in to Service B. But if Service B fails to include the image tag, the user would be left in a state where central server 170 would have cleared the Visited Sites cookie issued in its own domain to indicate Service A as desiring authentication. To address this problem, Service B includes one image tag in the domain of central server 170 for the site ID of Service A and one image tag to clear the Visited Sites cookie issued by central server 170. Alternatively, instead of having the image tag for the site ID of Service A to redirect and perform the sign-in, this image tag could clear the Desire Authentication cookie issued by Service A that indicates Service A has already expressed a desire to authenticate the user. This means that when the user revisits Service A, a call to the Desire Authentication URL would result in a redirect to central server 170, as the Desire Authentication cookie previously issued by Service A is no longer stored on client computer system 162. Since the user now has already been authenticated by central server 170, he or she will be automatically authenticated for Service A.

In any case, the user may thereafter navigate to Service A again at 228. This time, the Desire Authentication cookie issued by Service A has already been cleared. Service A thus can use an image tag on its web page to point to the Desire Authentication URL, which will return OK to indicate that the user can be soft authenticated by redirecting the browser to the Desire Authentication URL. However, in cases where a redirect with encrypted tickets is used, the user is automatically signed in to Service A, and Service A is granted access to the user's profile information in order to provide premium or personalized content to the user.

Later, when the user navigates to Service C for the first time at 230, Service C, which may or may not require the user to be authenticated, redirects the browser to central server 170 for authentication at 232 and 234. Since client computer system 162 already has a cookie written in the domain of central server 170, central server 170 may determine that the user has already been authenticated and, accordingly, does not prompt the user for his or her credentials. Instead, central server 170 at 236 and 238 redirects the browser to a return URL of Service C with an encrypted authentication ticket and profile information attached.

Again, when the user visits Service A for the first time, Service A would redirect the browser to the Desire Authentication URL of central server 170. According to one embodiment of the invention, central server 170 at this point would determine if the user has already signed in to a site within a policy group to which Service A also belongs. If the user has already signed in to such a site, then central server 170 would redirect the browser to the return URL of Service A with an encrypted authentication ticket and profile information attached to the query string. In other words, if the user has already signed in to a site within the same policy group, central server 170 would automatically authenticate the user for Service A instead of delaying the authentication process.

According to one embodiment of the invention, the cookies issued by central server 170, Service A, and Service B are session cookies that may have encrypted time stamps. These time stamps make these cookies expire after a predefined period of time, and accordingly, the user will be automatically signed out of these services after the predefined period of time. In one embodiment of the invention, these issued cookies are automatically refreshed on the client computer system 162 within certain time intervals (e.g., updating these cookies hourly). This prevents the user from being signed out when he or she still wishes to access the services. For example, if the cookies are not refreshed, a site that offers personalized or premium content may not be able to identify the user if the user stays within the current browser session longer than the predefined period of time. In another example, unless the cookies are constantly refreshed, a service may stop providing stock quotes because a server that responds to extended markup language (XML) requests for stock information may no longer know who the user is.

It is also noted that the above-described embodiments of the invention are not limited to authenticating the user for a particular site or service. The described embodiments of the invention may also be utilized to provide services to the user generally. For example, when central server 170 has determined that the user is signed in to a site within the same policy group, instead of authenticating the user for access to a "desire authentication" site, central server 170 may direct the site to provide data or services to the user when the user revisits this site. In one example, such data or services may be targeted advertisements directed to the user based on the user's profile information. In another example, such data or services may be specifically designed for the demographic profile of the user (e.g., age, geographic location). That is, when the user revisits a "desire authentication" site, this site may customize its content based on the user's demographic profile without first authenticating the user.

The following provides an exemplary code for implementing the example illustrated in FIG. 2. A site or service that "desires" to authenticate the user (e.g., Service A) may include the following code in its web pages.

```
If mspsaCookie <> "" Then
    bDoSoftAuth = false
End If
If bloggedIn Then
    BDoSoftAuth = false
End If
```

As can be seen in this exemplary code, if the MSPSA cookie (i.e., the Desire Authentication cookie) has already been issued by the service or if the user has already logged or signed in to the service, then the service will not soft authenticate the user. This allows the service to efficiently authenticate the user without unnecessary roundtrips to central server 170.

Figure 3:
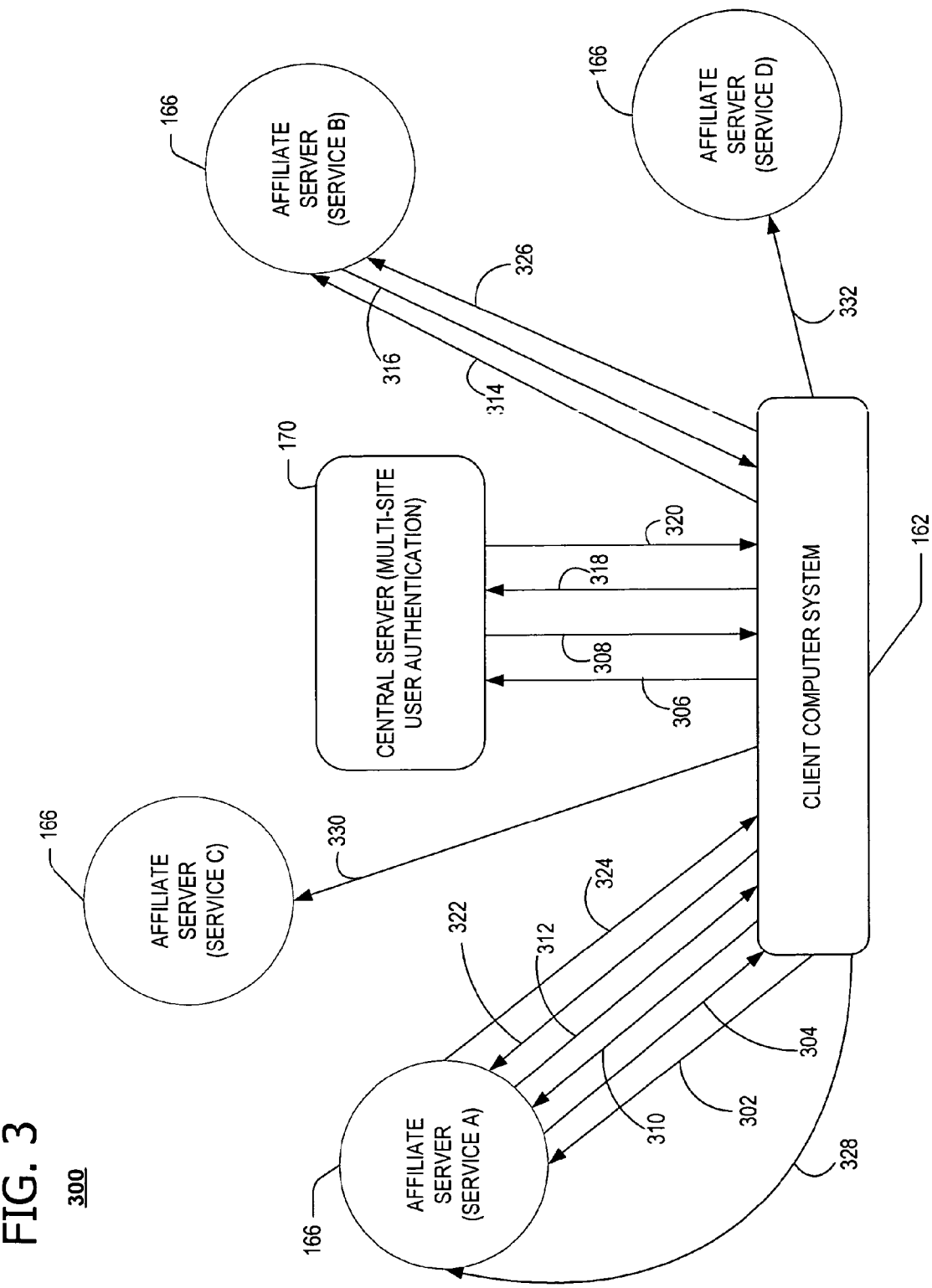
FIG. 3 is a diagram illustrating process flow according to one embodiment of the invention for providing services to a user.

FIG. 3 generally illustrates an exemplary process flow of one method (indicated generally by reference character 300) for providing services to a user according to one embodiment of the invention. In the example illustrated in FIG. 3, Service A, Service B, and Service C are members of Policy Group P but are in different domains, while Service D is a member of Policy Group Q. Furthermore, the illustrated example of FIG. 3 describes the situation in which the user of client computer system 162 has not yet logged into an affiliate server 166 and has not yet been authenticated by central server 170. The consecutively numbered lines with reference characters of 302-332 in FIG. 3 illustrate the flow of information or activities during one exemplary process.

At 302, the user uses a browser of client computer system 162 to visit Service A via an HTTP GET request. Because some of the web pages of Service A require the user to be signed in, Service A at 304 may attempt to authenticate the user, and accordingly, may respond to the HTTP GET request with an HTTP 302 status code back to the browser along with a return URL and a site ID of Service A in the query string. The HTTP 302 response then redirects the browser to a Desire Authentication URL maintained by central server 170. At 306, the browser accesses central server 170 at the Desire Authentication URL via an HTTP GET request and passes along the return URL and site ID of Service A.

At 308, central server 170 checks a Visited Sites cookie (which identifies the sites that the user has visited but not yet been authenticated for) issued in the domain of central server 170 and stored on client computer system 162. In this example, the Visited Sites cookie would indicate that the user has not yet signed in to a site within Policy Group P. Accordingly, central server 170 responds to the HTTP GET request with an HTTP 302 status code back to the browser. The HTTP 302 response then redirects the browser to the return URL of Service A. Furthermore, central server 170 will issue or update the Visited Sites cookie to include the site ID of Service A in a list of site IDs that desire to authenticate the user. Central server 170 will also access database 172 to obtain a policy group ID associated with the site ID of Service A (i.e., the policy group ID of Policy Group P) and include this policy group ID in the Visited Sites cookie along with the site ID of Service A. This updated Visited Sites cookie is then stored on client computer system 162. The following provides an exemplary format of the Visited Sites cookie according to one embodiment of the invention.

```
Visited Sites cookie = [<logged_in_groups>]:[<desire_auth_sites>]
    logged_in_groups={@<policy_group_id>}
    desire_auth_sites={@<policy_group_id>#<site_id>}
```

For example, a Visited Sites cookie of @1@3@5:@24$13@34$15 would indicate that the user has signed in to sites within policy groups 1, 3, and 5, while site 13 of policy group 24 and site 15 of policy group 34 have requested to provide services to the user and have expressed a desire to authenticate the user.

At 310, the browser again accesses Server A via an HTTP GET request. Then, at 312, the browser of client computer system 162 receives an HTTP 200 response from Service A, which shows content of Service A that does not require the user to be signed in (e.g. non-personalized content). Service A further issues a Desire Authentication cookie in its own domain to indicate that Service A has already requested central server 170 to authenticate the user for this browser session. The Desire Authentication cookie is then stored on client computer system 162. On a subsequent visit to Service A or within subsequent web pages of Service A, Service A will not again attempt to authenticate the user (e.g., by redirecting the browser to the Desire Authentication URL of central server 170) if it sees the Desire Authentication cookie issued in its domain stored on client computer system 162.

Thereafter, within the same browser session, the user uses the browser of client computer system 162 to navigate to Service B via an HTTP GET request at 314. Service B requires the user to be signed in (e.g., because Service B provides personalized or premium content to the user). Because the user has not been authenticated by central server 170, Service B responds to the HTTP GET request with an HTTP 302 status code back to the browser and redirects the browser to an Authentication URL of central server 170 at 316. Alternatively, Service B may render a link on its web page that prompts the user to provide his or her credentials to sign in to Service B. In any case, however, the browser is directed to the Authentication URL of central server 170. When directing or redirecting the browser to this Authentication URL, a return URL and a site ID of Service B are attached to the query string. At 318, the browser of client computer system 162 accesses the Authentication URL of central server 170 via an HTTP GET request and passes along the return URL and site ID of Service B to central server 170. The Authentication URL then prompts the user for his or her user credentials.

After central server 170 verifies the credentials submitted by the user and thus authenticates the user for Service B (or otherwise has already signed in the user to a site within the domain of Service B), central server 170 at 320 accesses database 172 to obtain a policy group ID associated with the site ID of Service B. Central server 170 then determines if this obtained policy group ID is already recorded in the Visited Sites cookie stored on client computer system 162. Since Service A and Service B both belong to Policy Group P, central service 170 will see that the policy group ID of Service B is already recorded in the Visited Sites cookie and that the site ID of Service A is also recorded in the Visited Sites cookie as associated with this policy group ID. Accordingly, central server 170 may conclude that Service A desires to authenticate the user and may respond to the HTTP GET request by rendering a web page with an HTTP 200 status code back to the browser. According to one embodiment of the invention, this web page includes transparent image tags (e.g., one-pixel gif files) that direct to Expire Cookie URLs for the corresponding site IDs listed in the Visited Sites cookie. These Expire Cookie URLs may include an mspsa=1 parameter in their query strings to indicate that the Expire Cookie URLs are utilized to remove the corresponding Desire Authentication cookies.

At 322, as part of rendering the web page of central server 170, the browser of client computer system 162 will access the specified Expire Cookie URLs via HTTP GET requests. Upon accessing the Expire Cookie URLs (which include the mspsa=1 query string parameter), the corresponding sites (including Service A) will at 324 respond to the HTTP GET requests with HTTP 200 status codes returning transparent image tags. These transparent image tags include scripts that are called to clear their corresponding Desire Authentication cookies stored on client computer system 162. At 326, using JavaScript or other techniques, the browser of client computer system 162 may access the return URL of Service B via an HTTP GET request after the transparent image tags have been set. This return URL of Service B will pass along an encrypted authentication ticket issued by central server 170 and profile information of the user to Service B in order to sign in the user to Service B. At this point, central server 170 will remove the site ID of Service A from the Visited Sites cookie because the Desire Authentication cookie of Service A is cleared from client computer system 162 (i.e., Service A is notified that the user has signed in to another site within Policy Group P) and the user has effectively been "soft" authenticated for Service A.

Thereafter, within the same browser session, if the user navigates to Service A again at 328, Service A will redirect the browser to central server 170 for authentication because the Desire Authentication cookie issued in the domain of Service A no longer exists on client computer system 162. But this time, since the user has already signed in to a site within Policy Group P, namely Service B, central server 170 will automatically sign in the user to Service A, and an encrypted authentication ticket and profile information of the user will be communicated to Service A. If the user now navigates to Service C at 330, which is also in Policy Group P but has not been previously visited by the user during the current browser session, a redirect to the Desire Authentication URL of central server 170 will similarly automatically sign in the user to Service C.

According to one embodiment of the invention, if Service C desires additional information from the user (e.g., acceptance of Terms of Usage, birthday, etc.), central server 170 would return an error code in the query string back to the browser without an authentication ticket and user profile information. On the other hand, if Service C does not desire additional information from the user, central server 170 would redirect the browser to a return URL of Service C with an authentication ticket and user profile information attached to the query string.

Now, if the user visits Service D for the first time at 332 and has not previously signed in to a site within Policy Group Q during the current session, then a redirect to the Desire Authentication URL of central server 170 (which will not prompt the user for credentials) will not automatically sign in the user to Service D, until the user is later signed in to a site within Policy Group Q. Accordingly, central server 170 would return an error code in the query string back to the browser without an authentication ticket and user profile information. It is noted that the user may still manually sign in to Service D by, for example, clicking a link on Service D that directs the user to the Authentication URL of central server 170 (which will prompt the user for his or her credentials).

When the user decides to sign out of a site (e.g., by clicking a link to sign out), the browser of client computer system 162 will similarly access a URL of central server 170 via an HTTP GET request. Central server 170 will respond to the HTTP GET request by rendering a web page with an HTTP 302 status code back to the browser. This web page also includes transparent image tags (e.g., gifs) that direct to Expire Cookie URLs for the site IDs to which the user has signed in. The browser will then access the specified Expire Cookie URLs via HTTP GET requests. Upon accessing the Expire Cookie URLs, the sites will respond to the HTTP GET requests with HTTP 302 status codes returning transparent image tags. These transparent image tags include scripts that may be called to delete the Desire Authentication cookies and other cookies issued in their own domains. The scripts, however, will not delete the Visited Sites cookie issued by central server 170. Instead, central server 170 will update the Visited Sites cookie to remove the site IDs of these sign-out sites from the Visited Sites cookie.

According to one embodiment of the invention, the Desire Authentication URL provided by central server 170 is the standard Authentication URL but with a special query string parameter attached to it so that central server 170 may recognize the "desire" authentication request. In this embodiment of the invention, sites or services desiring to authenticate the user via the Desire Authentication URL may include an mspsa=1 query string parameter to the standard Authentication URL. And when the browser of client computer system 162 is redirected to the Desire Authentication URL, central server 170 may compare the submitted site ID against the submitted return URL. If they do not match, central server 170 may respond with a generic site-error web page back to the browser.

According to another embodiment of the invention, when a site or service redirects the browser to central server 170 for authentication, it may append a time window parameter to the query string that specifies a period of time within which the user should be signed in to another site in order to grant the user access to the current site or service. If the user is not signed in to another site within this specified period of time, then central server 170 will return an error code in the query string back to the browser. For example, if a particular site or service redirects the browser to the Desire Authentication URL of central server 170 with a parameter tw=600 (which indicates 600 seconds) attached to the query string, then central server 170 will return an error code if the user's last sign-in to another site within the same policy group occurred more than 600 seconds ago. In addition, the site or service may include a force sign-in parameter in the query string, which would force the user to resubmit his or her credentials if the time period specified by the tw parameter has already passed.

In yet another embodiment of the invention, in order to protect the user's privacy, the cookies such as the Visited Sites cookie and the Desire Authentication cookie are session cookies that do not include user specific information. Furthermore, in an alternative embodiment of the invention, instead of allowing the user to be automatically signed in to a site when he or she is already signed in to another site within the same policy group, central server 170 may automatically sign in the user when he or she is already signed in to another site within the same service group or is already signed in to any site.

Figure 4:
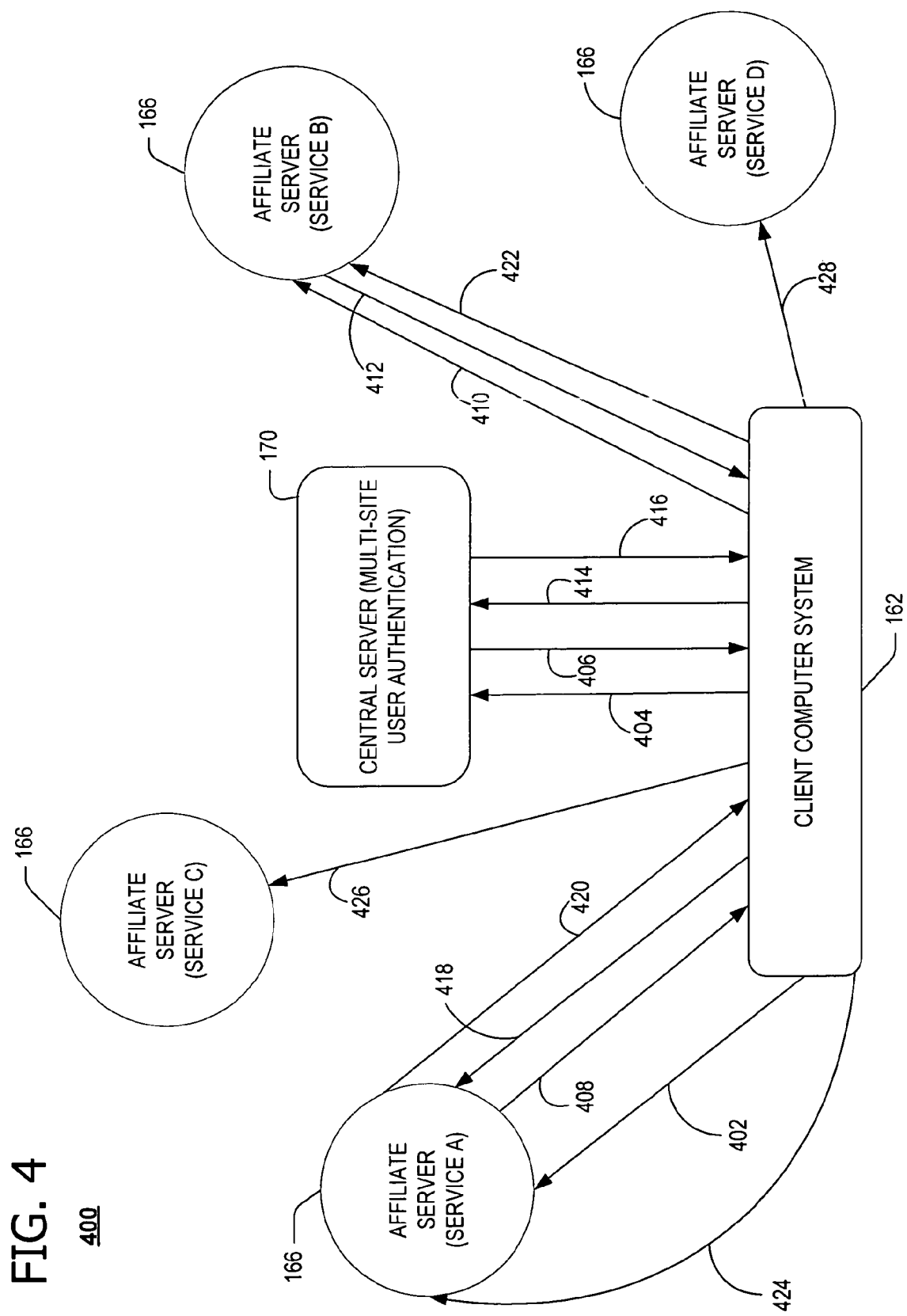
FIG. 4 is a diagram illustrating process flow according to another embodiment of the invention for providing services to a user.

FIG. 4 generally illustrates an exemplary process flow of one method (indicated generally by reference character 400) for providing services to a user according to one alternative embodiment of the invention. Similar to FIG. 3, in the example illustrated in FIG. 3, Service A, Service B, and Service C are members of Policy Group P but are in different domains, while Service D is a member of Policy Group Q. Furthermore, the illustrated example of FIG. 4 describes the situation in which the user of client computer system 162 has not yet logged into an affiliate server 166 and has not yet been authenticated by central server 170. The consecutively numbered lines with reference characters of 402-428 in FIG. 4 illustrate the flow of information or activities during one exemplary process.

At 402, the user uses a browser of client computer system 162 to visit Service A via an HTTP GET request. Because some of the web pages of Service A require the user to be signed in, Service A at 404 may attempt to authenticate the user, and accordingly, may respond to the HTTP GET request with another HTTP GET request to access a Desire Authentication URL of central server 170. That is, as the browser of client computer system downloads a web page of Service A, a client-side HTTP GET request to access the Desire Authentication URL of central server 170 will be issued. This HTTP GET request will pass along a return URL and a site ID of Service A to central server 170.

At 406, central server 170 checks a Visited Sites cookie issued in the domain of central server 170 and stored on client computer system 162. In this example, the Visited Sites cookie would indicate that the user has not yet signed in to a site within Policy Group P. Accordingly, central server 170 responds to the HTTP GET request with an HTTP 200 status code back to the browser. Specifically, central server 170 will return a script to the browser that communicates the following parameters in the query string without an authentication ticket and user profile information: mspru=" "; mspsa≠1. The parameter mspru=" " indicates that there is no return URL to redirect the browser. The parameter mspsa≠1 indicates that the Desire Authentication URL of central server 170 is not available to sign in the user at this time.

Central server 170 will also issue or update the Visited Sites cookie to include the site ID of Service A in a list of site IDs that desire to authenticate the user. In addition, central server 170 will also access database 172 to obtain a policy group ID associated with the site ID of Service A (i.e., the policy group ID of Policy Group P) and include this policy group ID in the Visited Sites cookie along with the site ID of Service A. This updated Visited Sites cookie is then stored on client computer system 162. At 408, the browser of client computer system 162 receives an HTTP 200 response from Service A, which shows content of Service A that does not require the user to be signed in (e.g., non-personalized content). Service A further issues a Desire Authentication cookie in its own domain to indicate that Service A has already requested central server 170 to authenticate the user for this browser session. The Desire Authentication cookie is then stored on client computer system 162. On a subsequent visit to Service A or within subsequent web pages of Service A, Service A will not again attempt to authenticate the user (e.g., by redirecting the browser to the Desire Authentication URL of central server 170) if it sees this Desire Authentication cookie issued in its domain stored on client computer system 162.

Thereafter, within the same browser session, the user uses the browser of client computer system 162 to navigate to Service B via an HTTP GET request at 410. Service B requires the user to be signed in (e.g., because Service B provides personalized or premium content to the user). Since the user has not been authenticated by central server 170, Service B responds to the HTTP GET request with an HTTP 302 status code back to the browser and redirects the browser to an Authentication URL of central server 170 at 412. Along with this redirect are a return URL and a site ID of Service B attached to the query string. At 414, the browser of client computer system 162 accesses the Authentication URL of central server 170 via an HTTP GET request and passes along the return URL and site ID of Service B to central server 170. The Authentication URL then prompts the user for his or her user credentials.

After central server 170 verifies the credentials submitted by the user and thus authenticates the user for Service B (or otherwise has already signed in the user to a site within the domain of Service B), central server 170 at 416 accesses database 172 to obtain a policy group ID associated with the site ID of Service B. Central server 170 then determines if this obtained policy group ID is already recorded in the Visited Sites cookie stored on client computer system 162. Since Service A and Service B both belong to Policy Group P, central service 170 will see that the policy group ID of Service B is already recorded in the Visited Sites cookie and that the site ID of Service A is also recorded in the Visited Sites cookie as associated with this policy group ID. Accordingly, central server 170 may conclude that Service A desires to authenticate the user and may respond to the HTTP GET request by rendering a web page with an HTTP 200 status code back to the browser. According to one embodiment of the invention, this web page includes transparent image tags (e.g., one-pixel gif files) that direct to Expire Cookie URLs for the corresponding site IDs listed in the Visited Sites cookie. These Expire Cookie URLs may include an mspsa=1 parameter in their query strings to indicate that the Expire Cookie URLs are utilized to remove the corresponding Desire Authentication cookies.

At 418, as part of rendering the web page of central server 170, the browser of client computer system 162 will access the specified Expire Cookie URLs via HTTP GET requests. Upon accessing the Expire Cookie URLs (which include the mspsa=1 query string parameter), the corresponding sites (including Service A) will at 420 respond to the HTTP GET requests with HTTP 200 status codes returning transparent image tags. These transparent image tags include scripts that are called to clear their corresponding Desire Authentication cookies stored on client computer system 162. At 422, using JavaScript or other techniques, the browser of client computer system 162 may access the return URL of Service B via an HTTP GET request after the transparent image tags have been set. This return URL of Service B includes an encrypted authentication ticket issued by central server 170 and profile information of the user attached to its query string in order to sign in the user to Service B. At this point, central server 170 will remove the site ID of Service A from the Visited Sites cookie because the Desire Authentication cookie of Service A is cleared from client computer system 162 (i.e., Service A is notified that the user has signed in to another site within Policy Group P) and the user has effectively been "soft" authenticated for Service A.

Thereafter, within the same browser session, if the user navigates to Service A again at 424, Service A will redirect the browser to central server 170 for authentication because the Desire Authentication cookie issued in the domain of Service A no longer exists on client computer system 162. This time, however, since the user has already signed in to a site within Policy Group P, namely Service B, central server 170 will automatically sign in the user to Service A, and an encrypted authentication ticket and profile information of the user will be communicated to Service A. If the user now navigates to Service C at 426, which is also in Policy Group P but has not been previously visited by the user during the current browser session, a redirect to the Desire Authentication URL of central server 170 will similarly automatically sign in the user to Service C.

According to one exemplary embodiment of the invention, if Service C desires additional information from the user (e.g., acceptance of Terms of Usage, birthday, etc.), central server 170 would return the following parameters in the query string back to the browser without an authentication ticket and user profile information: mspru=" "; mspsa≠1. On the other hand, if Service C does not desire additional information from the user, central server 170 would return the following parameters in the query string back to the browser: mspru="<ru>&t&p" and mspsa=1. In this scenario, mspru="<ru>&t&p" indicates that after the user has provided the additional information to central server 170, the browser is redirected to the return URL "ru" of Service C with "t" (authentication ticket) and "p" (profile information) attached to the query string. Furthermore, mspsa=1 indicates that central server 170 has been notified of the desire of Service C to authenticate the user.

Now, if the user visits Service D for the first time at 428 and has not previously signed in to a site within Policy Group Q during the current session, then a redirect to the Desire Authentication URL of central server 170 (which will not prompt the user for credentials) will not automatically sign in the user to Service D, until the user is later signed in to a site within Policy Group Q. Accordingly, central server 170 would return the following parameters in the query string back to the browser: mspru=" "; mspsa≠1 (i.e., without an authentication ticket and profile information attached). Nevertheless, the user may still manually sign in to Service D by, for example, clicking a link on Service D that directs the user to the Authentication URL of central server 170 (which will prompt the user for his or her credentials).

As can be seen, in this alternative embodiment of the invention illustrated in FIG. 4, a client-side HTTP GET request instead of an HTTP 302 is used to access the Desire Authentication URL of central server 170, and accordingly does not impose dependency on the availability of central server 170 for the user to navigate to a particular site or service. In the example illustrated in FIG. 3, a user navigating to a site or service will be redirected to a web page of central server 170 via HTTP 302. The disadvantage of using HTTP 302 is that if central server 170 is unavailable (e.g., server is down or in maintenance), the user would be rendered a "Central Server 170 Not Found" web page with an HTTP 404 status code. On the other hand, a client-side HTTP GET as illustrated in FIG. 4 will not direct the user to a URL of central server 170 if central server 170 is not available. Another advantage of the alternative embodiment of the invention illustrated in FIG. 4 is that it reduces latency on web page downloads. For example, in the case where a user navigates to a site or service without having previously signed in to another site or service within the same policy group, central server 170 in this alternative embodiment of the invention will set a null value for the mspru query string parameter and a flag in the mspsa parameter to indicate that the user may not be signed in at this time. Returning such query string parameters may result in decreased download latency as compared to returning an error code as illustrated in FIG. 3. Tables 1-3 highlight the differences between embodiments illustrated in FIG. 3 and embodiments illustrated in FIG. 4.

Scenario A: User not Signed in

TABLE 1

User Not Signed In
Scenario A: User Not Signed In

| Method 300 | Method 400 |
|---|---|
| Client GET to site <-> 302 to central server 170 | Client GET to site <-> 200 OK |
| Client GET to central server 170 <-> 302 to site | Client GET to central server 170 <-> 200 OK |
| Client GET to site <-> 200 OK | |
| Number of trips = 3 | Number of trips = 2 |

Scenario B: User Signed in

TABLE 2

User Signed In
Scenario B: User Signed In

| Method 300 | Method 400 |
|---|---|
| Client GET to site <-> 302 to central server 170 | Client GET to site <-> 200 OK |
| Client GET to central server 170 <-> 302 to site | Client GET to central server 170 <-> 200 OK |
| Client GET to site <-> 200 OK | |
| Number of trips = 3 | Number of trips = 2 |

TABLE 3

Central Server 170 Unavailable
Scenario C: Central Server 170 Unavailable

| Method 300 | Method 400 |
|---|---|
| Client GET to site <-> 302 to central server 170 | Client GET to site <-> 200 OK |
| Client GET to central server 170 <-> 404 Page Not Found | Client GET to central server 170 <-> 404 Page Not Found |
| Net result - User is in a 404 page | Net result - User is in the site |

According to one embodiment of the invention, after the browser accesses the Desire Authentication URL of central server 170 via an HTTP GET request, central server 170 will communicate a script to the site or service that desires to authenticate the user. This site or service has a client-side script that checks for the values of query string parameters returned from central server 170. If the mspsa parameter is not set to 1 and if the user is not authenticated for the site or service by central server 170, then the site or service may fetch the client-side script to client computer 162. In contrast, if the mspsa parameter is set to 1 (which indicates that central server 170 has been notified of the desire of the site or service to authenticate the user) or if the user is authenticated for the site or service, then the site or service will not fetch the client-side script to client computer 162. APPENDIX A provides an exemplary code for implementing this process.

Figure 5:
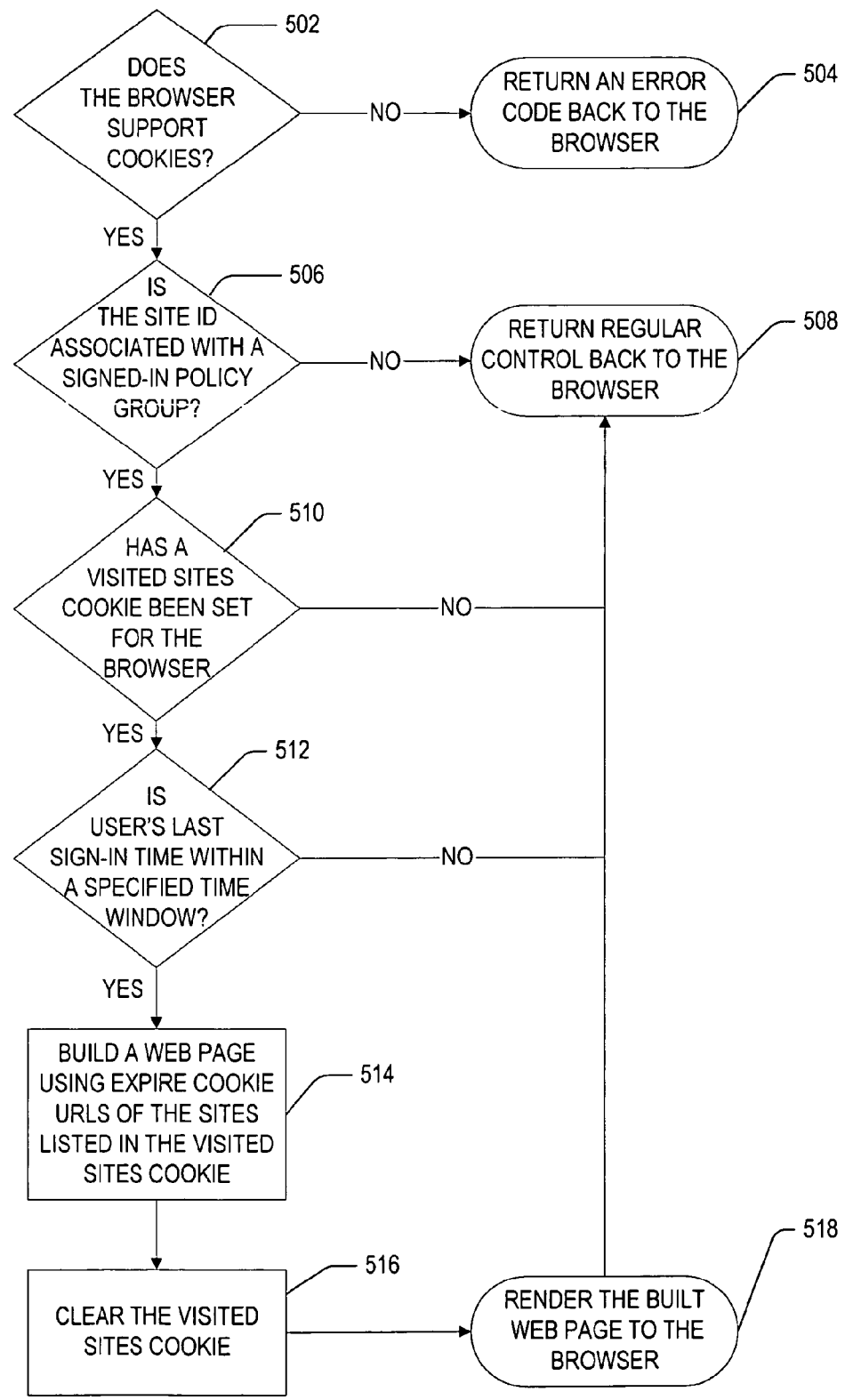
FIG. 5 is an exemplary flow diagram illustrating process flow according to one embodiment of the invention for signing in a user to a site or service without forcing the user to provide user credentials.

FIG. 5 generally illustrates an exemplary process flow for central server 170 to sign in a user to a site or service according to one embodiment of the invention. Beginning at 502, central server 170 determines if a browser of client computer system 162 supports cookies. This may mean additional redirects to set a test cookie (e.g., a Visited Sites cookie). If central server 170 determines that the browser does not support cookies, then central server 170 returns an error code to the browser at 504. Conversely, if central server 170 determines that the browser supports cookies, then central server 170 at 506 checks a Visited Sites cookie to determine if the site ID of the current site is associated with a policy group of a site to which the user has already signed in. If the site ID of the current site is not associated with such a policy group, central server 170 returns the regular control back to the browser of client computer system 162 at 508. But if the site ID of the current site is associated with such a policy group, central server 170 at 510 determines if it has already set a Visited Sites cookie for the browser of client computer system 162.

If central server 170 has not set a Visited Sites cookie for the browser, central server 170 then returns the regular control back to the browser of client computer system 162 at 508. In contrast, if central server 170 has already set a Visited Sites cookie for the browser, central server 170 at 512 determines if the user's last sign-in time is within a time window specified in a query string parameter. If the user's last sign-in time is not within the specified time window, then central server 170 returns the regular control back to the browser of client computer system 162 at 508. On the other hand, if the user's last sign-in time is within the specified time window, central server 514 builds a web page using Expire Cookie URLs of the sites listed in the Visited Sites cookie previously set by central server 170. At 516, central server 170 clears the Visited Sites cookie or updates the Visited Sites cookie to remove the listed sites. At 518, central server 170 renders the built web page to the browser of client computer system 162 and signs in the user to the current site (or authenticates the user for the current site). Then, central server 170 returns the regular control back to the browser at 508.

FIG. 6 shows one example of a general purpose computing device in the form of a computer 70. In one embodiment of the invention, a computer such as the computer 70 is suitable for use in client computer system 162, central server 170, or an affiliate server 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. The modulated data signal has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 6 illustrates operating system 84, application programs 86, other program modules 88, and program data 90.

The computer 70 may also include other removable/non-removable, volatile/nonvolatile computer storage media. For example, FIG. 6 illustrates a hard disk drive 94 that reads from or writes to non-removable, nonvolatile magnetic media. FIG. 6 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 6, provide storage of computer readable instructions, data structures, program modules and other data for the computer 70. In FIG. 6, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 6 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 6 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media contain instructions or programs for implementing the steps described herein in conjunction with a microprocessor or other data processor. One embodiment of the invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, an embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics including mobile phones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein to provide services to a user via a client coupled to a data communication network. A first network server coupled to the data communication network is configured to provide a first service to the user via the client. A second network server coupled to the data communication network is configured to provide a second service to the user via the client. Computer-executable instructions receive a first request from the first network server to provide the first service to the user. Computer-executable instructions store first data on the client in response to the received first request. The first data identifies the first service. Computer-executable instructions receive a second request from the second network server to provide the second service to the user. Computer-executable instructions allow the user access to the second service in response to the received second request. After the user is allowed access to the second service, computer-executable instructions further allow the user access to the first service as a result of the stored first data.

The following provides one particular example of user scenario according to one embodiment of the invention. John lives in the United Kingdoms. He has foo.co.uk as his home page, but chooses not to be automatically signed in when his browser session opens. Accordingly, when John opens his browser session and navigates to foo.co.uk, foo.co.uk will determine that John is not signed in to a site within the same policy group as foo.co.uk (e.g., foo.com). But foo.co.uk decides not to prompt John for his credentials and thus provides John with non-personalized, free-reach content. Later, John visits foo.com, which is in the same policy group as foo.co.uk and requires credentials from John in order to allow John access to its contents. After John has been authenticated for foo.com, he then navigates back to foo.co.uk. At this point, John will be automatically authenticated for foo.co.uk without resubmitting his credentials because he has already been authenticated for foo.com. As a result, John may now access personalized or premium content of foo.co.uk. When John clicks a link to sign out, he will be signed out of foo.com, foo.co.uk, and other sites within the same policy group as foo.com and foo.co.uk.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

APPENDIX A

The following provides an exemplary code for implementing soft authentication according to embodiments of the invention.

```
<%
Function DoSoftAuth
    If bDoSoftAuth Then
        Dim AuthURL : AuthURL =
oMgr.AuthURL(Server.URLEncode(sThisPage), iTimeWindow,
bForceSignIn, bCobrandArgs, langId, TRUE,0,0)
        Dim SoftAuthURL : SoftAuthURL = AuthUrl + "&mspsa=1"
        Dim ticketpath:ticketpath =
oMgr.GetCurrentConfig("TicketPath")
        Dim ticketdomain:ticketdomain =
oMgr.GetCurrentConfig("TicketDomain")
        If (ticketpath <> "") Then
            ticketpath = ";path="+ticketpath
        End If
        If (ticketdomain <> "") Then
            ticketdomain = ";domain="+ticketdomain
        End If
        softAuthImage = "<img onload=""""DoSoftAuth(1)""""
onerror=""""DoSoftAuth(0)"""" src="""" + SoftAuthURL +
"""" border=""""0"""">"
        If (Left(AuthURL,5) = "http:") then
            AuthURL = Left(AuthURL,4) + "s" + Mid(AuthURL, 5)
        End If
<%
<script language="javascript" type="text/javascript">
function DoSoftAuth(doAuth)
{
    If (doAuth) {
        alert("Logged in");
        location.replace("<%=AuthURL%>");
    } Else {
        alert("Not logged in");
        document.cookie =
"MSPSA=1<%=ticketdomain%><%=ticketpath%>";
    }
}
</script>
```

What is claimed is:

1. A method for providing a first service and a second service to a user via a client being coupled to a data communication network, said first service being provided by a first network server also being coupled to the data communication network, said second service being provided by a second network server also being coupled to the data communication network, said method comprising:

receiving a first request from the first network server to provide the first service in a first domain to the user wherein the user is not authenticated for the first service and not authenticated for the second service when the first request is received;

storing first data on the client in response to the received first request, said first data identifying the first service wherein the user is not authenticated for the first service and not authenticated for the second service when the first data is stored;

allowing the user to access the first service without authenticating the user during which the user continues to be unauthenticated for the first service and unauthenticated for the second service wherein the first service does not receive an authentication ticket and profile information associated with the user and wherein the user is not authenticated for the first service;

receiving a second request from the second network server to provide the second service, which is in a second domain which is different than the first domain, to the user wherein the second service requires authentication of the user, wherein the user is not authenticated for the first service and wherein the first service does not have an authentication ticket and profile information associated with the user;

authenticating the user for the second service in response to the received second request;

allowing the user access to the second service in response to authenticating the user for the second service wherein the user is not authenticated for the first service and wherein the first service does not have an authentication ticket and profile information associated with the user;

generating, in response to authenticating the user for the second service, an authentication ticket and profile information associated with the user wherein the generated authentication ticket and profile information is communicated to the second service, wherein the user is not authenticated for the first service and wherein the first service does not have an authentication ticket and profile information associated with the user; and authenticating, in response to the authentication of the user for the second request, the user for the first service identified in the stored first data wherein, in response to the authentication of the user for the first service, the generated authentication ticket and profile information is communicated to the first service.

2. The method of claim 1, wherein the stored first data indicates a policy group associated with the first service, and further comprising allowing, in response to allowing the user access to the second service, the user access to the first service prior to authenticating the user for the first service if the second service is associated with the policy group indicated by the stored first data.

3. The method of claim 2, wherein members of the policy group share a set of business rules, said set of business rules comprising a privacy policy.

4. The method of claim 1 wherein said receiving the first request comprises receiving the first request from a first network server via an image tag.

5. The method of claim 1, further comprising storing second data on the client in response to the received first request, said second data being issued by the first network server to indicate that the first network server has requested to provide the first service to the user.

6. The method of claim 5, wherein the first data and the second data are implemented as cookies stored on the client.

7. The method of claim 5, wherein on a subsequent visit to the first network server by the user, the first network server is adapted not to request to provide the first service to the user if the second data is stored on the client.

8. The method of claim 5, wherein the stored first data indicates a policy group associated with the first service, and further comprising deleting the second data from the client in response to allowing the user access to the second service if the second service is associated with the policy group indicated by the stored first data.

9. The method of claim 8, wherein said deleting comprises rendering a web page to the client, said web page including an image tag directing the client to a script of the second service, said script adapted to delete the second data from the client.

10. A system for providing services to a user, said system comprising:
   a first network server coupled to a data communication network, said first network server being configured to provide a first service to a user via a client also coupled to the data communication network;
   a second network server coupled to the data communication network, said second network server being configured to provide a second service to the user via the client;
   a central server coupled to the data communication network, said central server being configured to receive a first request from the first network server to provide the first service to the user and a second request from the second network server to provide the second service to the user;
   said first network server being configured to direct the first request to the central server, said central server further being configured to generate and store first data on the client in response to receiving the first request, said first data identifying the first service wherein the user is not authenticated for the first service and not authenticated for the second service, said first service allowing the user to access the first service without authenticating the user during which the user continues to be unauthenticated for the first service and unauthenticated for the second service;
   said second network server being configured to direct the second request to the central server, said second service requiring authentication of the user;
   wherein, in response to the received second request, the central server is configured to allow the user access to the second service wherein the user is authenticated by the central server for the second service in response to the received second request, wherein the central server authenticates the user via a database having a unique identifier corresponding to the user, and wherein the user is allowed to use the second service for a predefined period of time; and
   wherein, in response to authentication of the user by the second request, the central server is configured to authenticate the user for the first service identified in the stored first data.

11. The system of claim 10, wherein the first network server and the second network server are configured to communicate the first request and the second request to the central server via an image tag.

12. The system of claim 11, further comprising a database associated with the central server, said database configured to store an identification corresponding to the user to be authenticated, said database providing said identification to the central server to allow the central server to authenticate the user, said database being further configured to store information identifying a first policy group associated with the first service and a second policy group associated with the second service, wherein the first policy group defines a shared set of business rules to restrict authentication of a user across different domains and the second policy group defines a shared set of business rules to restrict authentication of a user across different domains; and
   wherein the second network server is being configured to generate and store second data on the client if the second policy group identified by the stored information identifying the second policy group associated with the second service is not the same as the first policy group identified by the stored first data, said second data indicating that the second network server has communicated the second request to the central server, said second request indicating a desire of the second network server to provide the second service to the user; and
   wherein on a subsequent visit to the second network server by the user, the second network server is configured not to direct a request to the central server to provide the second service to the user if the second data is stored on the client.

13. The system of claim 12, wherein the updated first data further identifies the second policy group associated with the second service.

14. The system of claim 13, further comprising:
   a third network server coupled to the data communication network, said third network server being configured to provide a third service to the user via the client;
   said central server being further configured to receive a third request from the third network server to provide the third service to the user and to authenticate the user for access to the third service in response to the received third request;
   wherein the stored information identifying the third policy group associated with the third service further identifies a third policy group associated with the third service, the third policy group defines a shared set of business rules to restrict authentication of a user across different domains; and
   wherein the central server is configured to allow the user access to the second service on a subsequent visit to the second network server if the user has been authenticated and if the third policy group identified by the stored information identifying the third policy group associated with the third service is the same as the second policy group identified by the updated first data.

15. A system for providing services to a user, said system comprising:
   a first network server coupled to a data communication network, said first network server being configured to provide a first service to a user via a client also coupled to the data communication network, said first service requiring authentication of the user;
   a second network server coupled to the data communication network, said second network server being configured to provide a second service to the user via the client;
   a central server coupled to the data communication network, said central server being configured to receive a first request from the first network server to provide the first service to the user and a second request from the second network server to provide the second service to the user;

a database associated with the central server, said database configured to store an identification corresponding to the user to be authenticated, said database providing said identification to the central server to allow the central server to authenticate the user, said database being further configured to store information identifying a first policy group associated with the first service and a second policy group associated with the second service, wherein the first policy group defines a shared set of business rules to restrict authentication of a user across different domains and the second policy group defines a shared set of business rules to restrict authentication of a user across different domains;

wherein, in response to the received first request, the central server is configured to allow the user access to the first service and to generate and store first data on the client based on the stored information identifying the first policy group associated with the first service, said first data identifying the first policy group associated with the first service wherein the central server authenticates the user for the first service in response to the received first request, wherein the user is allowed to use the first service for a predefined period of time;

wherein if the second policy group identified by the stored information identifying the second policy group associated with the second service is the same as the first policy group identified by the stored first data, the central server is configured to allow the user access to the second service in response to the received second request wherein the user is authenticated by the central server for the second service in response to the received second request; and wherein if the second policy group identified by the stored information identifying the second policy group associated with the second service is not the same as the first policy group identified by the stored first data, the central server is configured to update the stored first data to identify the second service in response to the received second request and the central server is configured to allow the unauthenticated user to access the second service during which the user continues to be unauthenticated for the second service.

16. The system of claim 15, wherein the second network server is being configured to generate and store second data on the client if the second policy group identified by the stored information identifying the second policy group associated with the second service is not the same as the first policy group identified by the stored first data, said second data indicating that the second network server has communicated the second request to the central server, said second request indicating a desire of the second network server to provide the second service to the user; and wherein on a subsequent visit to the second network server by the user, the second network server is configured not to direct a request to the central server to provide the second service to the user if the second data is stored on the client.

17. The system of claim 15, wherein the updated first data further identifies the second policy group associated with the second service.

18. The system of claim 17, further comprising:
a third network server coupled to the data communication network, said third network server being configured to provide a third service to the user via the client;
said central server being further configured to receive a third request from the third network server to provide the third service to the user and to authenticate the user for access to the third service in response to the received third request;
wherein the stored information identifying the third policy group associated with the third service further identifies a third policy group associated with the third service, the third policy group defines a shared set of business rules to restrict authentication of a user across different domains; and
wherein the central server is configured to allow the user access to the second service on a subsequent visit to the second network server if the user has been authenticated and if the third policy group identified by the stored information identifying the third policy group associated with the third service is the same as the second policy group identified by the updated first data.

19. The system of claim 18, wherein the second network server is being configured to generate and store second data on the client if the second policy group identified by the stored information identifying the second policy group associated with the second service is not the same as the first policy group identified by the stored first data, said second data indicating that the second network server has communicated the second request to the central server, said second request indicating a desire of the second network server to provide the second service to the user; and wherein on a subsequent visit to the second network server by the user, the second network server is configured not to direct a request to the central server to provide the second service to the user if the second data is stored on the client.

20. The system of claim 15, wherein the first network server and the second network server are configured to communicate the first request and the second request to the central server via an image tag.

* * * * *